(12) United States Patent
Hori et al.

(10) Patent No.: US 12,346,543 B2
(45) Date of Patent: Jul. 1, 2025

(54) TERMINAL APPARATUS, METHOD OF OPERATING TERMINAL APPARATUS, AND SYSTEM FOR ADJUSTING SHARED IMAGES ON SCREEN

(71) Applicant: TOYOTA JIDOSHA KABUSHIKI KAISHA, Aichi-ken (JP)

(72) Inventors: Tatsuro Hori, Tokyo-to (JP); Jorge Pelaez, Kawaguchi (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 199 days.

(21) Appl. No.: 18/361,908

(22) Filed: Jul. 31, 2023

(65) Prior Publication Data

US 2024/0036716 A1     Feb. 1, 2024

(30) Foreign Application Priority Data

Aug. 1, 2022   (JP) ................. 2022-122926

(51) Int. Cl.
  *G06F 3/0485*     (2022.01)
  *G06F 3/04845*    (2022.01)
  *G06F 3/04883*    (2022.01)

(52) U.S. Cl.
  CPC ...... *G06F 3/04845* (2013.01); *G06F 3/04883* (2013.01)

(58) Field of Classification Search
  CPC .................. G06F 3/04845; G06F 3/04883
  See application file for complete search history.

(56) References Cited

FOREIGN PATENT DOCUMENTS

| | | | |
|---|---|---|---|
| JP | 2001111708 A | 4/2001 |
| JP | 2011-010348 A | 1/2011 |
| JP | 2015022377 A | 2/2015 |
| JP | 2021-036401 A | 3/2021 |

*Primary Examiner* — Haoshian Shih
(74) *Attorney, Agent, or Firm* — HAUPTMAN HAM, LLP (57) ABSTRACT

A terminal apparatus includes an input/output screen including a rectangular input/output area configured to accept touch input and display an image, a communication interface configured to communicate with another terminal apparatus including the input/output area having a different longitudinal direction, and a controller configured, upon input of an image to the input/output area of the terminal apparatus, to transmit to the another terminal apparatus an output image that contains the image and corresponds to a first square area having one short side of the input/output area as one side and to cause the another terminal apparatus to display the output image in a second square area having one short side of an input/output area of the another terminal apparatus as one side. The controller is configured to set an area other than the first square area in the input/output area of the terminal apparatus as a new input/output area.

7 Claims, 10 Drawing Sheets

TERMINAL APPARATUS, METHOD OF OPERATING TERMINAL APPARATUS, AND SYSTEM FOR ADJUSTING SHARED IMAGES ON SCREEN

CROSS-REFERENCE TO RELATED APPLICATION

This application claims priority to Japanese Patent Application No. 2022-122926, filed on Aug. 1, 2022, the entire contents of which are incorporated herein by reference.

TECHNICAL FIELD

The present disclosure relates to a terminal apparatus, a method of operating a terminal apparatus, and a system.

BACKGROUND

Technology exists for computers at multiple locations to communicate with each other via a network, allowing the users of the computers to make voice calls to each other and exchange information, such as images drawn on a touch panel. Patent Literature (PTL) 1 discloses technology related to controlling the update timing of images shared among computers.

CITATION LIST

Patent Literature

PTL 1: JP 2015-022377 A

SUMMARY

It is inconvenient for users if the input or output environment for images and the like on each computer is different, as this may interfere with the output of shared images.

It would be helpful to disclose a terminal apparatus and the like that can adjust for environmental differences and contribute to user convenience.

A terminal apparatus in the present disclosure includes:
an input/output screen including a rectangular input/output area configured to accept touch input and display an image;
a communication interface configured to communicate with another terminal apparatus including the input/output area having a different longitudinal direction; and
a controller configured, upon input of an image to the input/output area of the terminal apparatus, to transmit to the another terminal apparatus an output image that contains the image and corresponds to a first square area having one short side of the input/output area as one side and to cause the another terminal apparatus to display the output image in a second square area having one short side of an input/output area of the another terminal apparatus as one side, wherein
the controller is configured to set an area other than the first square area in the input/output area of the terminal apparatus as a new input/output area.

Another terminal apparatus in the present disclosure includes:
an input/output screen including a rectangular input/output area configured to accept touch input and display an image;
a communication interface configured to communicate with another terminal apparatus including the input/output area having a different longitudinal direction; and
a controller configured, upon an image being inputted to an input/output area of the another terminal apparatus and an output image that contains the image and corresponds to a first square area having one short side of the input/output area as one side being transmitted from the another terminal apparatus, to display the output image in a second square area having one short side of the input/output area of the terminal apparatus as one side, wherein
the controller is configured to set an area other than the second square area in the input/output area of the terminal apparatus as a new input/output area.

A system in the present disclosure includes a pair of terminal apparatuses, each terminal apparatus including an input/output screen including a rectangular input/output area configured to accept touch input and display an image, a longitudinal direction of the input/output area differing between the terminal apparatuses, wherein
a first terminal apparatus is configured, upon input of an image to the input/output area of the first terminal apparatus, to transmit to a second terminal apparatus an output image that contains the image and corresponds to a square area having one short side of the input/output area as one side,
the second terminal apparatus is configured to display the output image in a square area having one short side of the input/output area of the second terminal apparatus as one side, and
the first terminal apparatus and the second terminal apparatus is each configured to set an area other than the square area in the input/output area of the corresponding terminal apparatus as a new input/output area.

According to the terminal apparatus and the like in the present disclosure, environmental differences between computers can be adjusted for, thus contributing to user convenience.

DETAILED DESCRIPTION

Embodiments are Described Below

Figure 1:
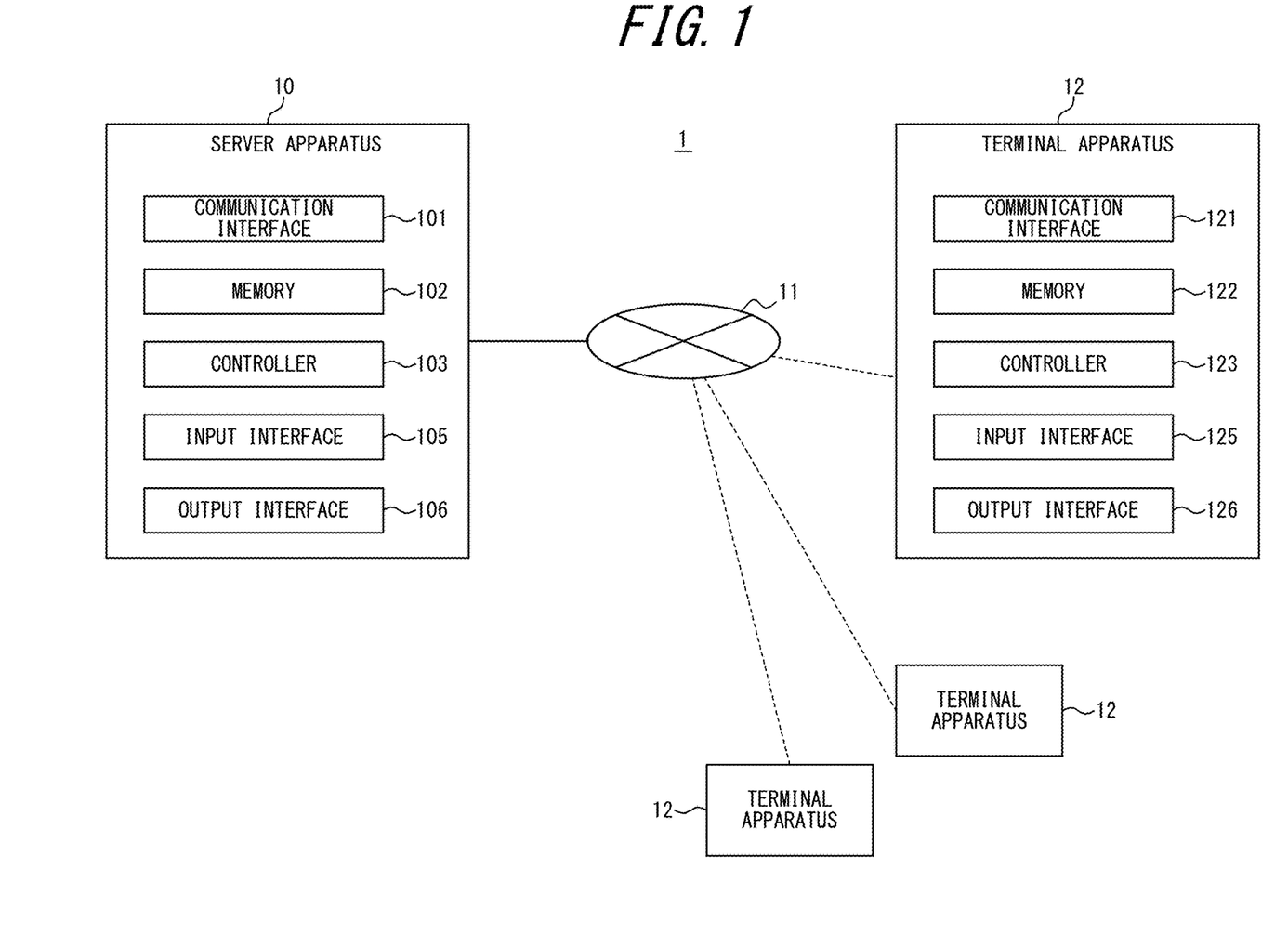
FIG. 1 is a diagram illustrating an example configuration of a communication system.

FIG. 1 is a diagram illustrating an example configuration of a communication system 1 in an embodiment. The communication system 1 includes a plurality of terminal apparatuses 12 and a server apparatus 10 that are connected via a network 11 to enable communication of information with each other. The communication system 1 is a system for enabling a plurality of users to call each other and share images using their respective terminal apparatuses 12.

The server apparatus 10 is, for example, a server computer that belongs to a cloud computing system or other computing system and functions as a server that implements various functions. The server apparatus 10 may be configured by two or more server computers that are communicably connected to each other and operate in cooperation. The server apparatus 10 executes relay processing for calls and images.

The terminal apparatus 12 is an information processing apparatus provided with communication functions and audio and video input/output functions and is used by each user. The terminal apparatus 12 is, for example, an information processing terminal, such as a smartphone or a tablet terminal; an information processing apparatus, such as a personal computer; a touch screen apparatus provided with communication and information processing functions; or the like.

The network 11 may, for example, be the Internet or may include an ad hoc network, a local area network (LAN), a metropolitan area network (MAN), other networks, or any combination thereof.

In the present embodiment, the terminal apparatus 12 includes an input interface 125 and output interface 126, which correspond to an input/output screen including a rectangular input/output area configured to accept touch input and display images. The terminal apparatus 12 also includes a communication interface 121 that communicates with another terminal apparatus 12 that includes an input/output area having a different longitudinal direction. Furthermore, upon input of an image to the input/output area of the terminal apparatus 12, a controller 123 of the terminal apparatus 12 transmits, to another terminal apparatus 12, an output image that contains the inputted information and corresponds to a square area having one short side of the input/output area as one side. Upon receiving an output image based on the input/output area of the other terminal apparatus 12 from the other terminal apparatus 12, the controller 123 displays the output image in the square area. The controller 123 then performs further processing to transmit an image or display an image, using an area other than the square area in its own input/output area as a new input/output area. According to the present embodiment, a pair of terminal apparatuses 12 that respectively include a vertical input/output area and a horizontal input/output area share an output image using a square area (hereinafter referred to as "shared area"), thereby enabling sharing of an output image while maintaining the aspect ratio and vertical orientation of the output image. Environmental differences between terminal apparatuses 12 can thus be adjusted for, contributing to user convenience.

Respective configurations of the server apparatus 10 and the terminal apparatuses 12 are described in detail.

The server apparatus 10 includes a communication interface 101, a memory 102, a controller 103, an input interface 105, and an output interface 106. These configurations are appropriately arranged on two or more computers in a case in which the server apparatus 10 is configured by two or more server computers.

The communication interface 101 includes one or more interfaces for communication. The interface for communication is, for example, a LAN interface. The communication interface 101 receives information to be used for the operations of the server apparatus 10 and transmits information obtained by the operations of the server apparatus 10. The server apparatus 10 is connected to the network 11 by the communication interface 101 and communicates information with the terminal apparatuses 12 via the network 11.

The memory 102 includes, for example, one or more semiconductor memories, one or more magnetic memories, one or more optical memories, or a combination of at least two of these types, to function as main memory, auxiliary memory, or cache memory. The semiconductor memory is, for example, Random Access Memory (RAM) or Read Only Memory (ROM). The RAM is, for example, Static RAM (SRAM) or Dynamic RAM (DRAM). The ROM is, for example, Electrically Erasable Programmable ROM (EEPROM). The memory 102 stores information to be used for the operations of the server apparatus 10 and information obtained by the operations of the server apparatus 10.

The controller 103 includes one or more processors, one or more dedicated circuits, or a combination thereof. The processor is a general purpose processor, such as a central processing unit (CPU), or a dedicated processor, such as a graphics processing unit (GPU), specialized for a particular process. The dedicated circuit is, for example, a field-programmable gate array (FPGA), an application specific integrated circuit (ASIC), or the like. The controller 103 executes information processing related to operations of the server apparatus 10 while controlling components of the server apparatus 10.

The input interface 105 includes one or more interfaces for input. The interface for input is, for example, a physical key, a capacitive key, a pointing device, a touch screen integrally provided with a display, or a microphone that receives audio input. The input interface 105 accepts operations to input information used for operation of the server apparatus 10 and transmits the inputted information to the controller 103.

The output interface 106 includes one or more interfaces for output. The interface for output is, for example, a display or a speaker. The display is, for example, a Liquid Crystal Display (LCD) or an organic Electro Luminescent (EL) display. The output interface 106 outputs information obtained by the operations of the server apparatus 10.

The functions of the server apparatus 10 are realized by a processor included in the controller 103 executing a control program. The control program is a program for causing a computer to function as the server apparatus 10. Some or all of the functions of the server apparatus 10 may be realized by a dedicated circuit included in the controller 103. The control program may be stored on a non-transitory recording/storage medium readable by the server apparatus 10 and be read from the medium by the server apparatus 10.

The terminal apparatus 12 includes a communication interface 121, a memory 122, the controller 123, an input interface 125, and an output interface 126.

The communication interface 121 includes a communication module compliant with a wired or wireless LAN standard, a module compliant with a mobile communication standard such as LTE, 4G, or 5G, or the like. The terminal apparatus 12 connects to the network 11 via a nearby router apparatus or mobile communication base station using the communication interface 121 and communicates information with the server apparatus 10 and the like over the network 11.

The memory 122 includes, for example, one or more semiconductor memories, one or more magnetic memories, one or more optical memories, or a combination of at least two of these types. The semiconductor memory is, for example, RAM or ROM. The RAM is, for example, SRAM or DRAM. The ROM is, for example, EEPROM. The memory 122 functions as, for example, a main memory, an auxiliary memory, or a cache memory. The memory 122 stores information to be used for the operations of the controller 123 and information obtained by the operations of the controller 123.

The controller 123 has one or more general purpose processors, such as CPUs or Micro Processing Units (MPUs), or one or more dedicated processors, such as GPUs, that are dedicated to specific processing. Alternatively, the controller 123 may have one or more dedicated circuits such as FPGAs or ASICs. The controller 123 is configured to perform overall control of the operations of the terminal apparatus 12 by operating according to the control/processing programs or operating according to operating procedures implemented in the form of circuits. The controller 123 then transmits and receives various types of information to and from the server apparatus 10 and the like via the communication interface 121 and executes the operations according to the present embodiment.

The input interface 125 includes one or more interfaces for input. The interface for input may include, for example, a physical key, a capacitive key, a pointing device, and/or a touch screen integrally provided with a display. The interface for input may also include a microphone that accepts audio input and a camera that captures images. The interface for input may further include a scanner, camera, or IC card reader that scans an image code. The input interface 125 accepts operations for inputting information to be used in the operations of the controller 123 and transmits the inputted information to the controller 123.

The output interface 126 includes one or more interfaces for output. The interface for output may include, for example, a display or a speaker. The display is, for example, an LCD or an organic EL display. The output interface 126 outputs information obtained by the operations of the controller 123.

In the present embodiment, the output interface 126 as a display and the input interface 125 as a touch screen integrated into the display correspond to the "input/output screen" for accepting input of images drawn by touch input and for displaying images. The "input/output area" is a part or all of the input/output screen where touch input and image display are performed.

The functions of the controller 123 are realized by a processor included in the controller 123 executing a control program. The control program is a program for causing the processor to function as the controller 123. Some or all of the functions of the controller 123 may be realized by a dedicated circuit included in the controller 123. The control program may be stored on a non-transitory recording/storage medium readable by the terminal apparatus 12 and be read from the medium by the terminal apparatus 12.

In the present embodiment, the controller 123 collects audio of the speech by the user of the terminal apparatus 12 with the microphone of the input interface 125 and accepts image input via touch input on the input/output screen. The controller 123 also generates encoded information by encoding the output image and audio information for playing back the user's speech. The controller 123 may perform any appropriate processing (such as resolution change and trimming) on the output image at the time of encoding. The controller 123 uses the communication interface 121 to transmit the encoded information to the other terminal apparatus 12 via the server apparatus 10. The controller 123 also receives encoded information, transmitted from the other terminal apparatus 12 via the server apparatus 10, using the communication interface 121. Upon decoding the encoded information, the controller 123 uses the decoded information to output the speech by the user of the other terminal apparatus 12 using the speaker of the output interface 126 or output the output image using the input/output screen.

Figure 2:
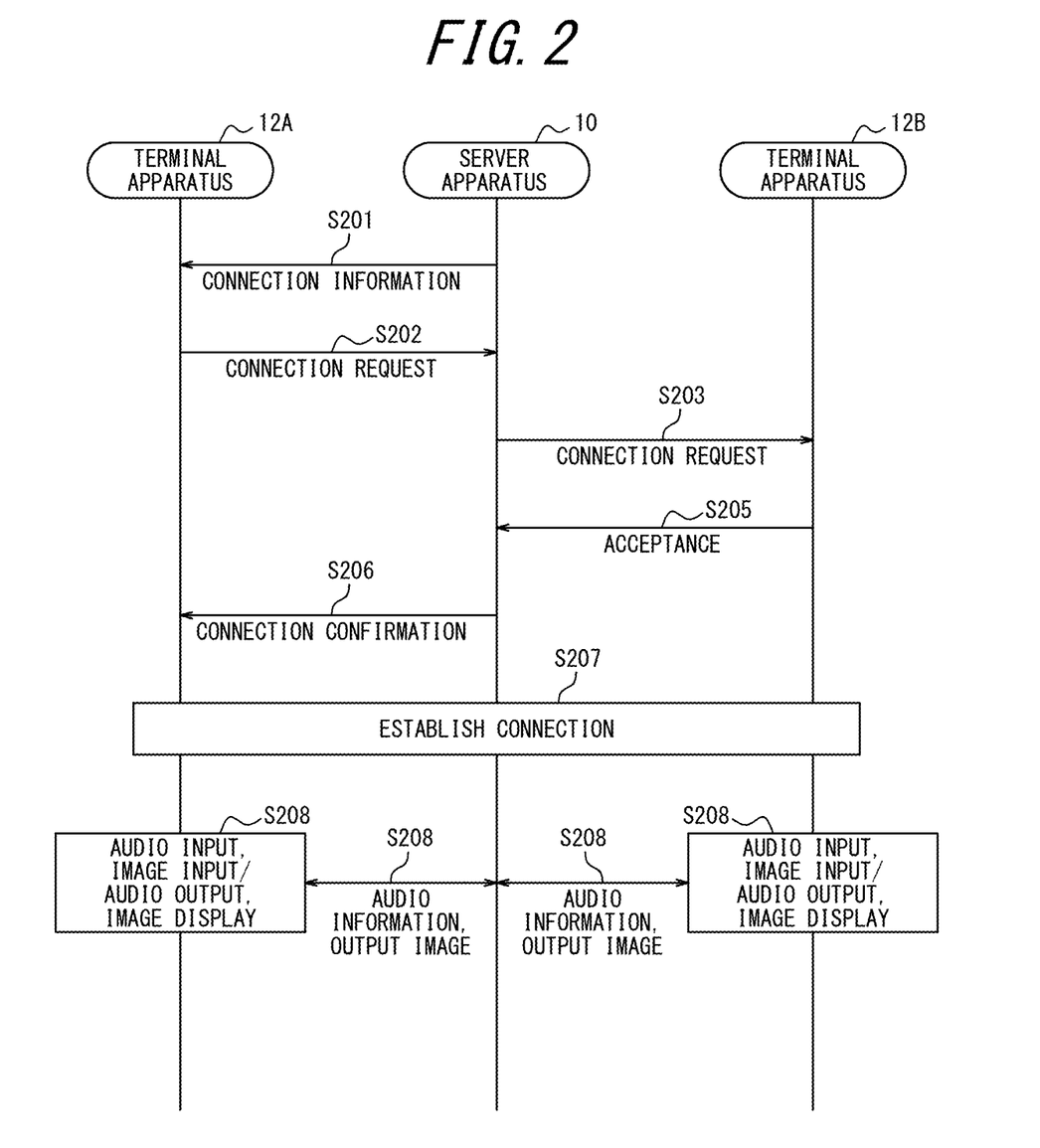
FIG. 2 is a sequence diagram illustrating an example of operations of the communication system.

FIG. 2 is a sequence diagram illustrating the operating procedures of the communication system 1. In this sequence diagram, an example of the operating procedures of the server apparatus 10 and the plurality of terminal apparatuses 12 communicating via the server apparatus 10 is illustrated by an example of the procedures of the server apparatus 10 and a pair of terminal apparatuses 12A, 12B. For subject matter common to the terminal apparatuses 12A, 12B, the collective term terminal apparatus 12 is used, whereas the terminal apparatuses 12A, 12B are referred to when distinguishing therebetween. The users of the terminal apparatuses 12A, 12B are referred to as user A and user B, respectively, for convenience.

The steps pertaining to the various information processing by the server apparatus 10 and the terminal apparatuses 12 in FIG. 2 are performed by the respective controllers 103 and 113. The steps pertaining to transmitting and receiving various types of information to and from the server apparatus 10 and the terminal apparatuses 12 are performed by the respective controllers 103 and 123 transmitting and receiving information to and from each other via the respective communication interfaces 101 and 121. In the server apparatus 10 and the terminal apparatuses 12, the respective controllers 103 and 123 appropriately store the information that is transmitted and received in the respective memories 102 and 122. Furthermore, the controller 123 of the terminal apparatus 12 accepts input of various types of information with the input interface 125 and outputs various types of information with the output interface 126.

In step S201, the server apparatus 10 transmits connection information to the terminal apparatus 12A. The connection information includes, for example, information indicating the called party that user A of the terminal apparatus 12A can call, such as user B of the terminal apparatus 12B. In step S202, the terminal apparatus 12A then transmits a request for connection with the terminal apparatus 12B to the server apparatus 10. For example, upon user A operating the terminal apparatus 12A and inputting a request to call user B, the terminal apparatus 12A transmits in response a connection request designating the terminal apparatus 12B to the server apparatus 10. For example, user A and user B register their respective identification information and information on the terminal apparatuses 12A, 12B in advance on a site for calling services that a calling service provider provides via the server apparatus 10. Then, when user A who wishes to make a call accesses the site for the calling service using the terminal apparatus 12A, information on user B is selectively acquired. The connection request is transmitted to the server apparatus 10 by user A selecting user B and inputting a call request.

In step S203, the server apparatus 10 transmits the connection request from the terminal apparatus 12A to the terminal apparatus 12B. In step S205, the terminal apparatus 12B then transmits acceptance of the connection to the server apparatus 10. For example, the terminal apparatus 12B displays a call request from user A of the terminal apparatus 12A to user B. Upon user B inputting acceptance to the terminal apparatus 12B, the terminal apparatus 12B transmits information indicating acceptance to the server apparatus 10 in response.

In step S206, the server apparatus 10 transmits connection information to the terminal apparatus 12A.

In step S207, the connection between the terminal apparatus 12A and the terminal apparatus 12B is established, and call preparation is completed.

In step S208, the terminal apparatuses 12A and 12B accept voice input and image input from user A and user B, respectively, and transmit audio information and output images to the other party via the server apparatus 10. The terminal apparatuses 12A and 12B also output the audio information and the output images transmitted from the other party to user A and user B, respectively. User A and user B thus make calls and share images using the terminal apparatuses 12A and 12B, respectively.

Figure 3A:
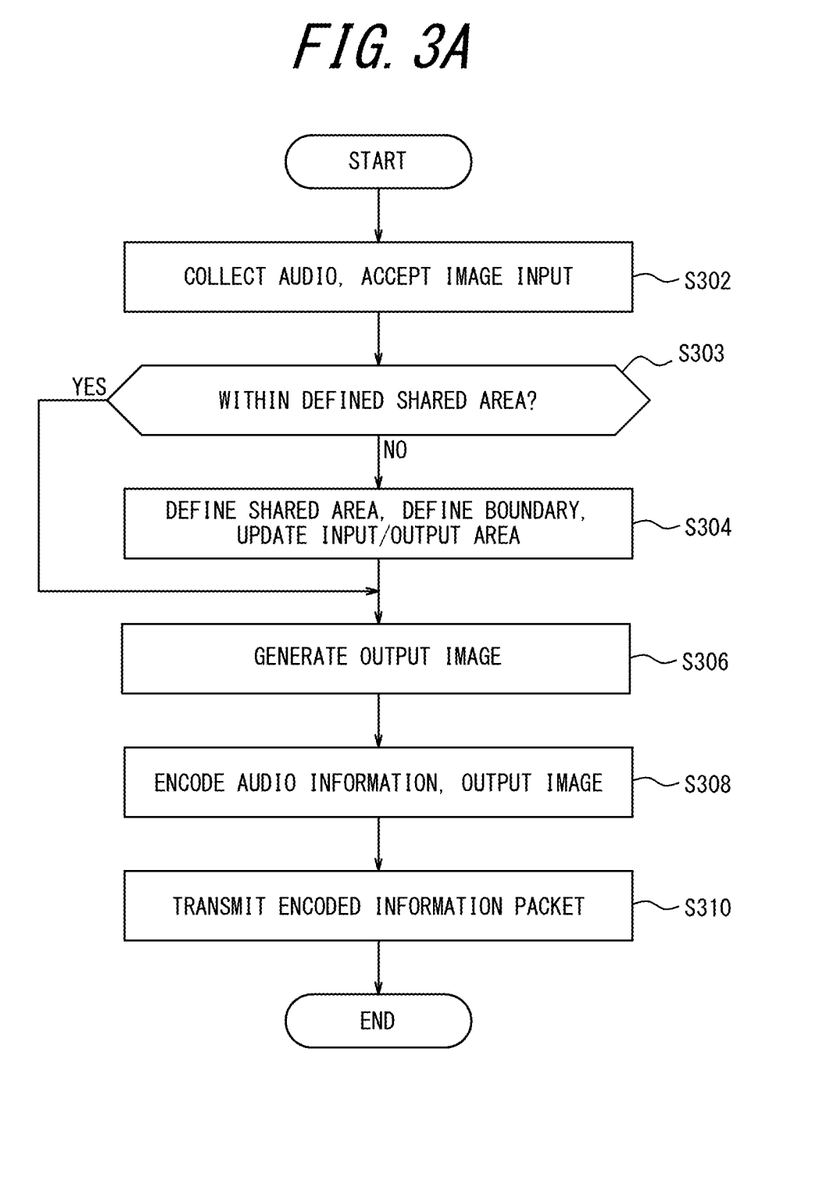
FIG. 3A is a flowchart illustrating an example of operations of a terminal apparatus.
Figure 3B:
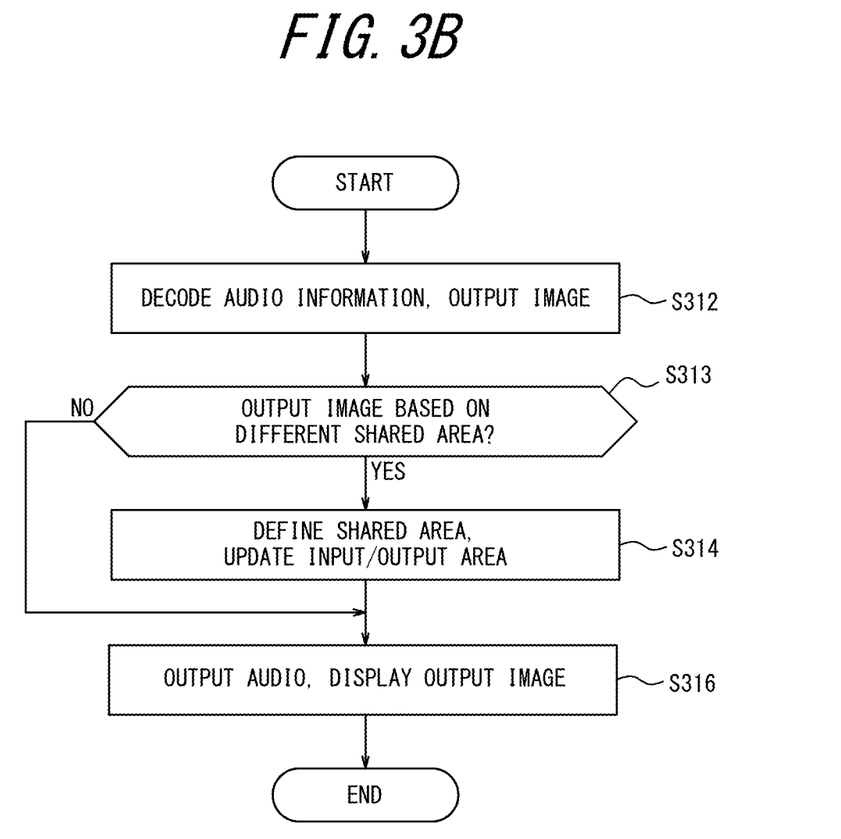
FIG. 3B is a flowchart illustrating an example of operations of a terminal apparatus.

A detailed procedural example of operations of the terminal apparatus 12 for step S208 are illustrated in FIGS. 3A and 3B.

FIGS. 3A and 3B are flowcharts illustrating the operating procedures of the terminal apparatus 12 for a call and image sharing. The procedures illustrated here are common to the terminal apparatuses 12A and 12B and are described without distinguishing between the terminal apparatuses 12A and 12B.

FIG. 3A relates to the operating procedures for the controller 123 when each terminal apparatus 12 transmits information based on audio and images inputted by the user using the respective terminal apparatus 12. The procedures in FIG. 3A are, for example, performed in freely determined cycles of several milliseconds to several tens of milliseconds.

In step S302, the controller 123 accepts the collection of audio of the user's speech and the input of an image by the input interface 125. The controller 123 acquires audio information and also acquires an inputted image from the input interface 125.

In step S303, the controller 123 determines whether the image input is within a defined shared area. In a case in which the shared area is not defined (No), the controller 123 advances to step S304.

In step S304, the controller 123 defines the shared area. The controller 123 defines a square shared area having the short side, in the rectangular input/output area, that is closer to the inputted image as one side. The controller 123 also defines a boundary between the shared area and the area other than the shared area in the input/output area. Furthermore, the controller 123 updates the input/output area to make the area other than the shared area in the input/output area a new input/output area.

Figure 4A:
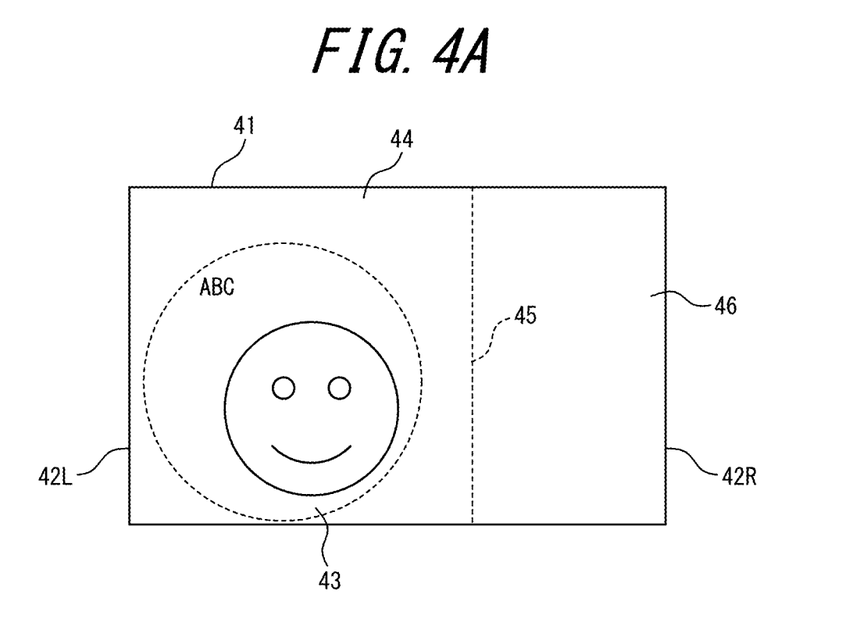
FIG. 4A is a diagram illustrating an example of an input/output area.
Figure 4B:
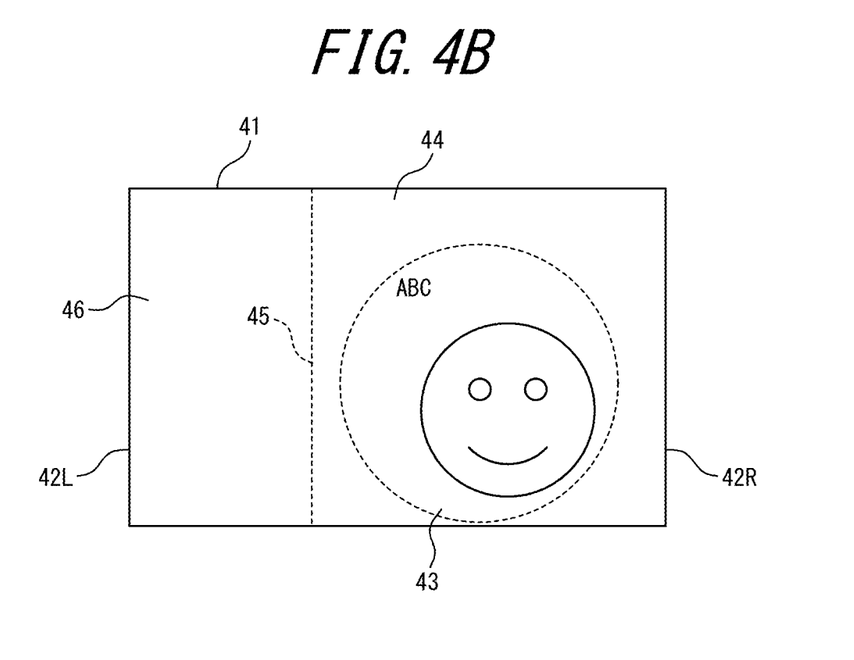
FIG. 4B is a diagram illustrating an example of an input/output area.
Figure 4C:
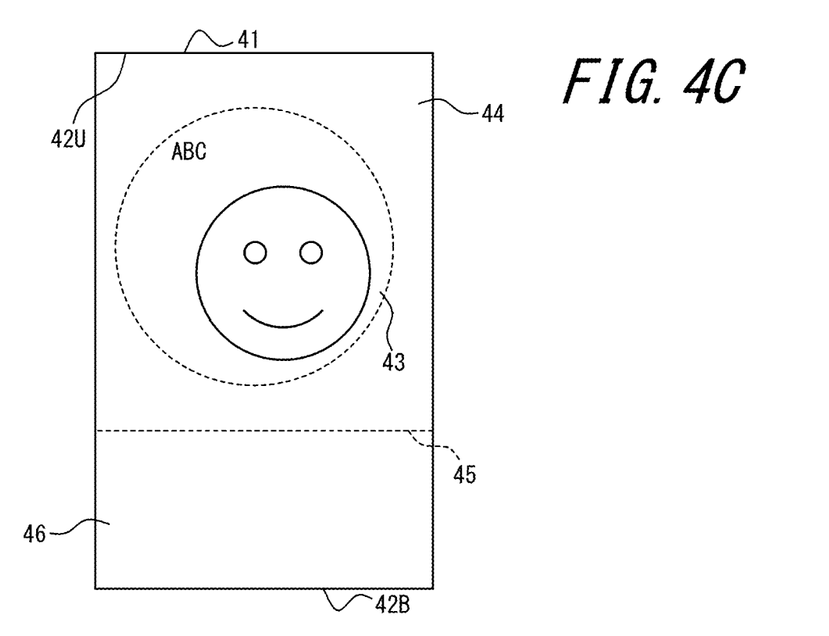
FIG. 4C is a diagram illustrating an example of an input/output area.
Figure 4D:
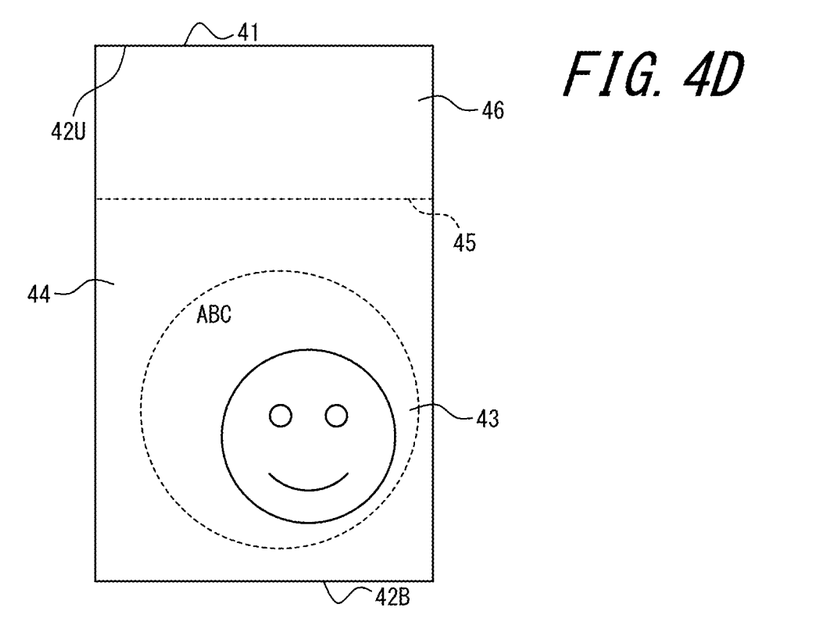
FIG. 4D is a diagram illustrating an example of an input/output area.

For example, in a case in which an image 43 is drawn near a left short side 42L in the input/output area 41 that has a horizontally elongated rectangular shape with left and right short sides 42L, 42R, as illustrated in FIG. 4A, a square shared area 44 having the short side 42L as one side is defined along with a boundary 45, and the input/output area 41 is updated as a new input/output area 46. For example, in a case in which an image 43 is drawn near the right short side 42R in the horizontally elongated input/output area 41, as illustrated in FIG. 4B, a square shared area 44 having the short side 42R as one side is defined along with a boundary 45, and the input/output area 41 is updated as a new input/output area 46. Furthermore, in a case in which an image 43 is drawn near a top short side 42U in the input/output area 41 that has a vertically elongated rectangular shape with top and bottom short sides 42U, 42B, as illustrated in FIG. 4C, a square shared area 44 having the top short side 42U as one side is defined along with a boundary 45, and the input/output area 41 is updated as a new input/output area 46. Furthermore, in a case in which an image 43 is drawn near the bottom short side 42B in the vertically elongated input/output area 41, as illustrated in FIG. 4D, a square shared area 44 having the bottom short side 42B as one side is defined along with a boundary 45, and the input/output area 41 is updated as a new input/output area 46.

Figure 4E:
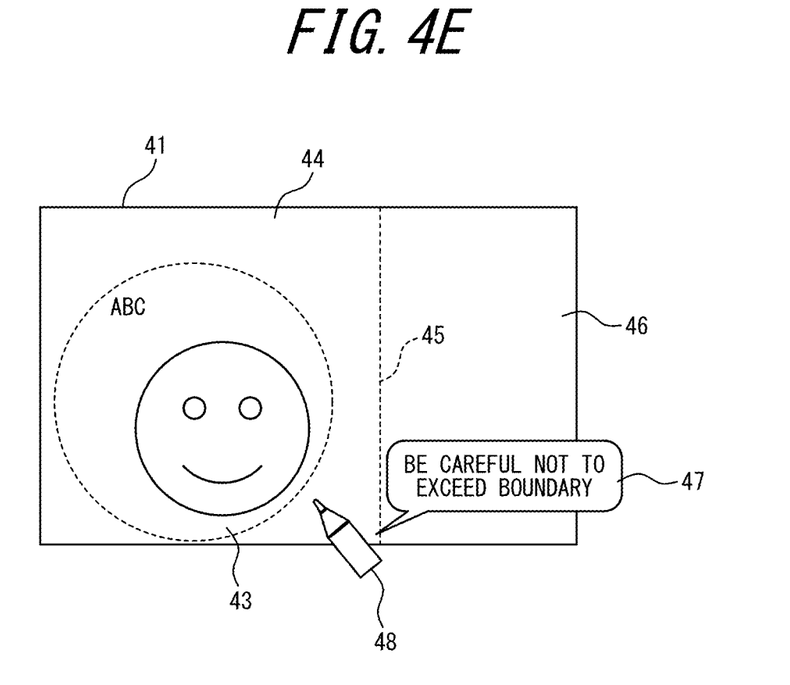
FIG. 4E is a diagram illustrating an example of an input/output area.

When determining whether the image 42 is closer to the short sides 42L, 42R or short sides 42U, 42B, the controller 123 calculates, for example, the distances between the position where drawing of the image 42 was started by touch input and each short side and compares the magnitudes of the distances. The controller 123 displays the boundary 45 in any manner, such as solid line or dotted line. As illustrated in FIG. 4E, when detecting a touch input 48 near the boundary 45 after defining the shared area 44 in the input/output area 41, the controller 123 may display a warning 47 to make the user aware of the boundary 45. The range considered to be near the boundary 45 is freely determined. With this configuration, the user can be prompted to input an image to the shared area 44. The warning 47 may be outputted as audio.

Returning to FIG. 3A, in step S306, the controller 123 generates an output image. The output image is a square image that contains the input image for the shared area and maintains the aspect ratio of the shared area. In addition, information identifying the defined shared area is attached to the output image.

In step S308, the controller 123 encodes the output image and the audio information to generate encoded information.

In step S310, the controller 123 converts the encoded information into packets using the communication interface 121 and transmits the packets to the server apparatus 10 for the other terminal apparatus 12.

FIG. 3B relates to the operating procedures of the controller 123 when the terminal apparatus 12 outputs speech of the called party and displays the output image. Upon receiving, via the server apparatus 10, a packet transmitted by the other terminal apparatus 12 performing the procedures in FIG. 3A, the controller 123 performs steps S312 to S316.

In step S312, the controller 123 decodes the encoded information included in the packet received from the other terminal apparatus 12 to acquire the audio information and output image.

In step S313, the controller 123 determines whether the output image is based on a different shared area. The controller 123 makes the determination using identification information, attached to the output image, for the shared area. In a case in which the output image is based on a new shared area (Yes), the controller 123 advances to step S314.

In step S314, the controller 123 defines a shared area for displaying the output image. The controller 123 defines a square shared area having a predetermined short side, in the rectangular input/output area, as one side. For example, a square shared area having the top short side, in the rectangular input/output area, as one side is defined. In another example, a square shared area having the left short side, in the rectangular input/output area, as one side is defined.

In step S316, the controller 123 outputs audio and also displays the output image using the output interface 126. The output image is displayed in a shared area defined in the input/output area.

Figure 5A:
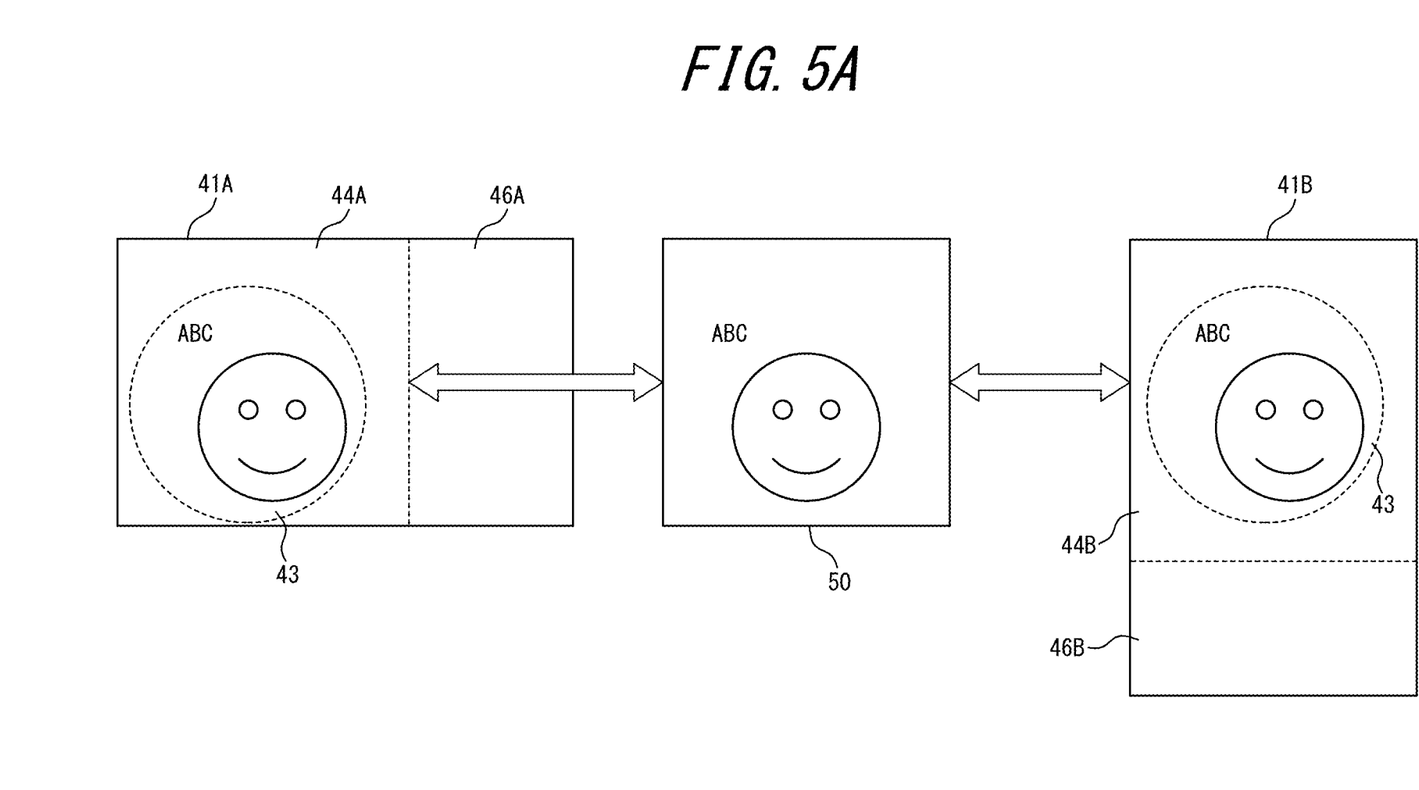
FIG. 5A is a diagram illustrating an example of image sharing.

FIG. 5A illustrates an example of sharing an output image 50 in input/output areas 41A, 41B, which have different longitudinal directions. For example, the terminal apparatus 12A has a horizontal input/output area 41A, and the terminal apparatus 12B has a vertical input/output area 41B. In this case, an image 43 is inputted to the input/output area 41A, and the shared area 44A is defined. The output image 50 corresponding to the shared area 44A is transmitted from the terminal apparatus 12A to the terminal apparatus 12B. The image 43 is then displayed in a shared area 44B defined in the input/output area 41B. Alternatively, the image 43 is inputted to the input/output area 41B, and the shared area 44B is defined. The output image 50 corresponding to the shared area 44B is transmitted from the terminal apparatus 12B to the terminal apparatus 12A. The image 43 is then displayed in a shared area 44A defined in the input/output area 41A. In both cases, the output image 50 is exchanged with the aspect ratio and image orientation thereof maintained. Sharing between the input/output areas 41A, 41B while maintaining the aspect ratio of the image 43 is thereby possible. An images that is additionally inputted to the shared areas 44A, 44B is shared by the shared areas 44A, 44B as part of the output image 50. In this case, in step S303 of FIG. 3A, the determination result becomes Yes, step S304 is omitted, and step S306 is executed. In step S313 of FIG. 3B, the determination result becomes No, step S314 is omitted, and step S316 is executed. Upon the shared areas 44A, 44B being defined, the input/output areas 41A, 41B are updated as input/output areas 46A, 46B respectively.

In a case in which an image is inputted to the updated input/output areas 46A, 46B, the determination result in step S303 in FIG. 3A becomes No. In step S304, a new shared area and boundary are then defined in the updated input/output area 46A or 46B, and the input/output area 46A or 46B is further updated to a new input/output area. Furthermore, the determination result in step S313 in FIG. 3B becomes Yes, and in step S314, a new shared area and boundary are defined in the updated input/output area 46A or 46B, and the input/output area 46A or 46B is further updated to a new input/output area.

Figure 5B:
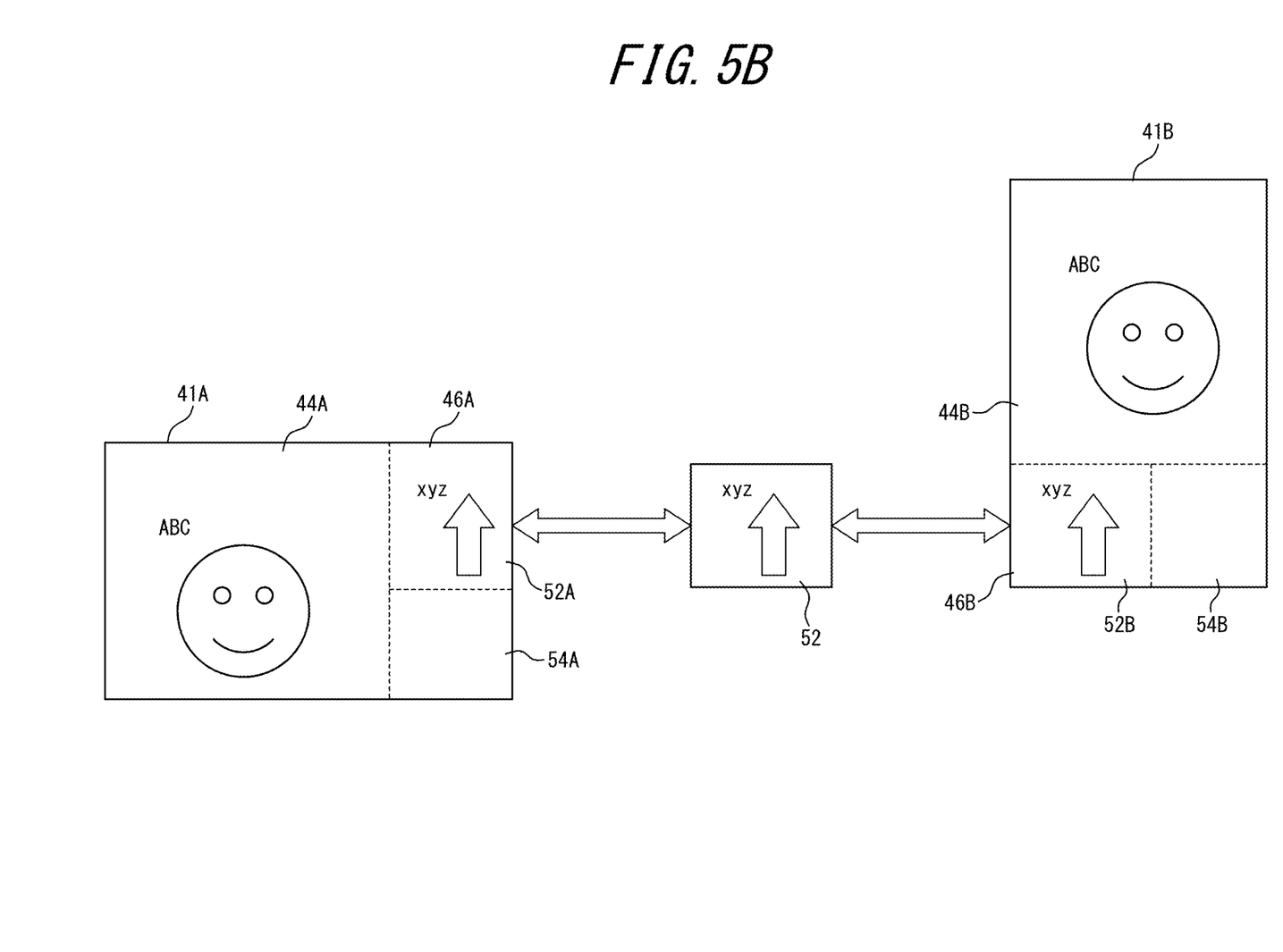
FIG. 5B is a diagram illustrating an example of image sharing.

FIG. 5B illustrates an example of image sharing in a case in which an image is inputted to the updated input/output areas 46A, 46B, which have different longitudinal directions from each other, as illustrated in FIG. 5A. When an image is inputted to the input/output area 46A, and a shared area 52A is defined, an output image 52 corresponding to the shared area 52A is transmitted from the terminal apparatus 12A to the terminal apparatus 12B, and the output image 52 is displayed in a shared area 52B defined in the input/output area 46B. Alternatively, when an image is inputted to the input/output area 46B, and a shared area 52B is defined, an output image 52 corresponding to the shared area 52B is transmitted from the terminal apparatus 12B to the terminal apparatus 12A, and the output image 52 is displayed in a shared area 52A defined in the input/output area 46A. Upon the shared areas 52A, 52B being defined, the input/output areas 46A, 46B are updated as input/output areas 54A, 54B respectively.

Figure 5C:
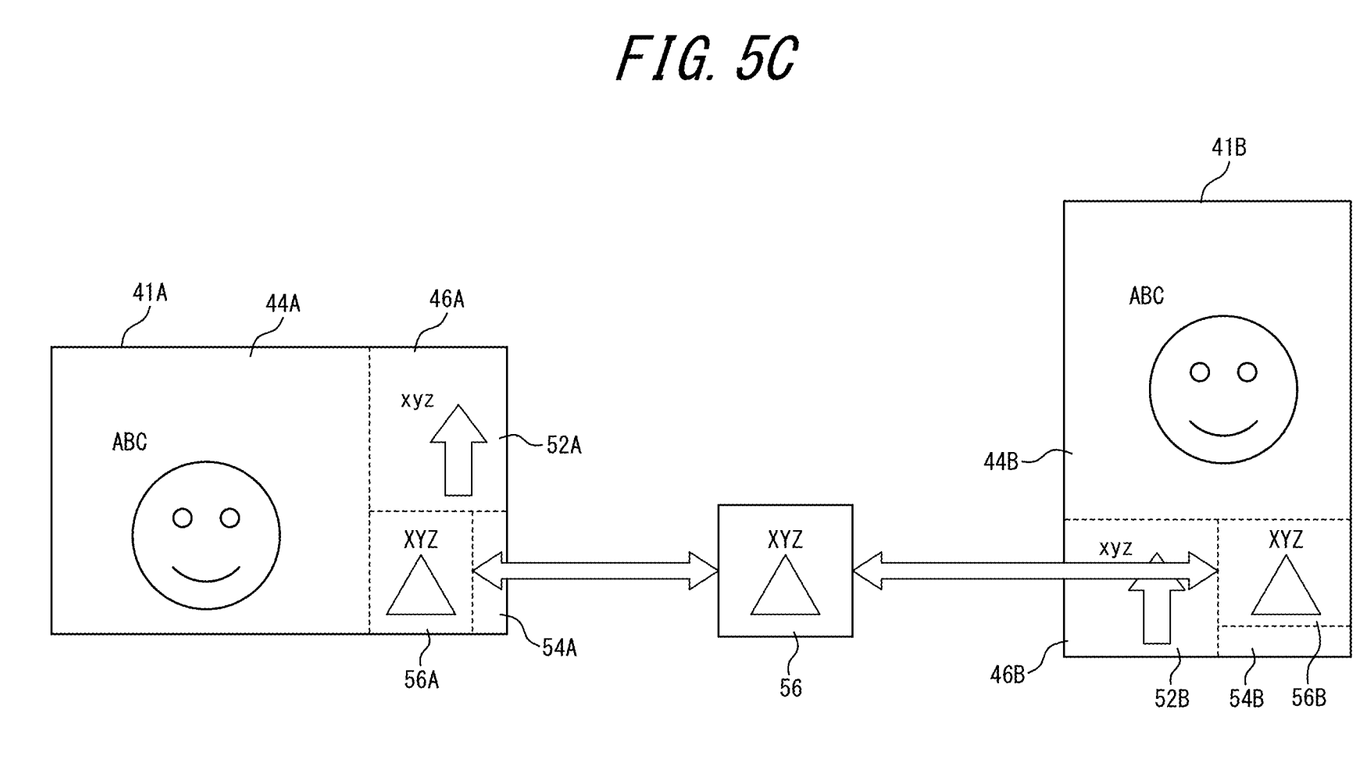
FIG. 5C is a diagram illustrating an example of image sharing.

FIG. 5C illustrates an example of image sharing in a case in which an image is inputted to the updated input/output areas 54A, 54B, which have different longitudinal directions from each other, as illustrated in FIG. 5B. When an image is inputted to the input/output area 54A, and a shared area 56A is defined, an output image 56 corresponding to the shared area 56A is transmitted from the terminal apparatus 12A to the terminal apparatus 12B, and the output image 56 is displayed in a shared area 56B defined in the input/output area 54B. Alternatively, when an image is inputted to the input/output area 54B, and a shared area 56B is defined, an output image 56 corresponding to the shared area 56B is transmitted from the terminal apparatus 12B to the terminal apparatus 12A, and the output image 56 is displayed in a shared area 56A defined in the input/output area 54A.

By the controller 123 repeatedly executing the steps in FIGS. 3A and 3B, the terminal apparatuses 12A, 12B hold a call and share images. Since the output image is shared while the aspect ratio is maintained, images can be shared without distorting the image or changing the orientation of the image. In addition, the input/output area is updated so that the margins of the input/output screen are effectively utilized. Environmental differences between terminal apparatuses can thus be adjusted for, contributing to user convenience.

While embodiments have been described with reference to the drawings and examples, it should be noted that various modifications and revisions may be implemented by those skilled in the art based on the present disclosure. Accordingly, such modifications and revisions are included within the scope of the present disclosure. For example, functions or the like included in each means, each step, or the like can be rearranged without logical inconsistency, and a plurality of means, steps, or the like can be combined into one or divided.

The invention claimed is:

1. A terminal apparatus comprising:
an input/output screen comprising a rectangular input/output area configured to accept touch input and display an image;
a communication interface configured to communicate with another terminal apparatus comprising the input/output area having a different longitudinal direction; and
a controller configured, upon input of an image to the input/output area of the terminal apparatus, to transmit to the another terminal apparatus an output image that contains the image and corresponds to a first square area having one short side of the input/output area as one side and to cause the another terminal apparatus to display the output image in a second square area having one short side of an input/output area of the another terminal apparatus as one side, wherein
the controller is configured to set an area other than the first square area in the input/output area of the terminal apparatus as a new input/output area.

2. The terminal apparatus according to claim 1, wherein the controller is configured to display a boundary between the first square area and a remainder of the input/output area of the terminal apparatus.

3. The terminal apparatus according to claim 2, wherein the controller is configured to output information indicating a warning when touch input near the boundary is detected.

4. A terminal apparatus comprising:
an input/output screen comprising a rectangular input/output area configured to accept touch input and display an image;
a communication interface configured to communicate with another terminal apparatus comprising the input/output area having a different longitudinal direction; and a controller configured, upon an image being inputted to an input/output area of the another terminal apparatus and an output image that contains the image and corresponds to a first square area having one short side of the input/output area as one side being transmitted from the another terminal apparatus, to display the output image in a second square area having one short side of the input/output area of the terminal apparatus as one side, wherein the controller is configured to set an area other than the second square area in the input/output area of the terminal apparatus as a new input/output area.

5. A system comprising a pair of terminal apparatuses, each terminal apparatus comprising an input/output screen comprising a rectangular input/output area configured to accept touch input and display an image, a longitudinal direction of the input/output area differing between the terminal apparatuses, wherein a first terminal apparatus is configured, upon input of an image to the input/output area of the first terminal apparatus, to transmit to a second terminal apparatus an output image that contains the image and corresponds to a square area having one short side of the input/output area as one side, the second terminal apparatus is configured to display the output image in a square area having one short side of the input/output area of the second terminal apparatus as one side, and the first terminal apparatus and the second terminal apparatus is each configured to set an area other than the square area in the input/output area of the respective terminal apparatus as a new input/output area.

6. The system according to claim 5, wherein the first terminal apparatus is configured to display a boundary between the square area and a remaining area of the input/output area of the first terminal apparatus.

7. The system according to claim 6, wherein the first terminal apparatus is configured to output information indicating a warning when touch input near the boundary is detected.

* * * * *